United States Patent
Bressan et al.

(10) Patent No.: US 6,843,542 B2
(45) Date of Patent: Jan. 18, 2005

(54) IMAGE DISPLAY DEVICE AND FRAME FOR SUCH A DEVICE

(75) Inventors: Claude Bressan, Angers (FR); Bernard Guerin, Cergy (FR); Gérard Vergneau, Osny (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 10/149,492

(22) PCT Filed: Dec. 15, 2000

(86) PCT No.: PCT/FR00/03570

§ 371 (c)(1),
(2), (4) Date: Sep. 23, 2002

(87) PCT Pub. No.: WO01/44909

PCT Pub. Date: Jun. 21, 2001

(65) Prior Publication Data

US 2003/0048047 A1 Mar. 13, 2003

(30) Foreign Application Priority Data

Dec. 17, 1999 (FR) .......................................... 99 15956

(51) Int. Cl.[7] .................................................. H04N 5/64
(52) U.S. Cl. ..................... 312/7.2; 312/265.5; 348/839
(58) Field of Search .............................. 312/7.2, 223.2, 312/265.5, 265.6, 263, 257.1; 348/836, 839; 220/4.28

(56) References Cited

U.S. PATENT DOCUMENTS

| 2,692,983 | A | * | 10/1954 | Eisenkramer ............... 348/823 |
| 3,294,905 | A | * | 12/1966 | Jonassen ..................... 348/841 |
| 4,017,129 | A | * | 4/1977 | Boldt et al. ................... 312/7.2 |
| 4,884,854 | A | * | 12/1989 | Joffe ......................... 312/257.1 |
| 5,067,022 | A |   | 11/1991 | Huerre et al. |
| 5,623,391 | A | * | 4/1997 | Chase et al. ................. 361/681 |
| 5,768,370 | A |   | 6/1998 | Maatta et al. ............... 379/433 |
| 5,806,940 | A |   | 9/1998 | Heirich ........................ 312/7.2 |
| 5,823,641 | A |   | 10/1998 | Goto et al. ................... 312/7.2 |

FOREIGN PATENT DOCUMENTS

| DE | 29616175 |   | 1/1997 | ............. G09F/9/33 |
| DE | 297 04 490 | * | 5/1997 | |
| DE | 29715913 |   | 12/1997 | ............. G06F/1/16 |
| JP | 121880 | * | 7/1983 | ................. 312/7.2 |
| JP | 175018 | * | 6/2002 | |

OTHER PUBLICATIONS

Derwent abstract of Ryu; acct # 2002–516282; Jan. 31, 2002.*

* cited by examiner

*Primary Examiner*—Janet M. Wilkens
(74) *Attorney, Agent, or Firm*—Joseph S. Tripoli; Harvey D. Fried; Patricia A. Verlangieri

(57) ABSTRACT

An image display device such as a television set or a monitor is disclosed. The image display device includes a front casing on which a screen and a rear casing are mounted. A frame surrounding the screen is detachably fastened to the front casing independently of the rear casing. The frame includes tabs capable of being manually handled in order to separate the frame from the front casing.

9 Claims, 4 Drawing Sheets

US 6,843,542 B2

IMAGE DISPLAY DEVICE AND FRAME FOR SUCH A DEVICE

This application claims the benefit, under 35 U.S.C. § 365 of International Application PCT/FR00/03570, filed Dec. 15, 2000, which was published in accordance with PCT Article 21(2) on Jun. 21, 2001 in French and which claims the benefit of French patent application No. 9915956 filed Dec. 17, 1999.

The present invention relates to image display devices such as television sets and monitors and to a frame for such devices.

BACKGROUND OF THE INVENTION

An image display device mainly comprises a display screen accommodated in a casing. The casing generally contains a chassis which carries electrical components in order to power the screen and transmit electrical signals representing the image to the screen.

According to a conventional solution, described for example in patent application WO 90/04902, the casing consists of a front part, on which the screen and the chassis are mounted, and of a rear part which closes the front part. The solution is particularly advantageous since it enables the screen to be properly positioned relative to the casing, as described in the aforementioned patent application.

However, it does not allow the user easily to change that part of the casing which surrounds the screen, for example in order to change the aesthetic appearance of the display device.

SUMMARY OF THE INVENTION

The invention proposes a device for displaying an image comprising a front casing on which a screen and a rear casing are mounted, a frame surrounding the screen being detachably fastened to the front casing independently of the rear casing, in which the frame comprises means capable of being handled manually in order to separate the frame from the front casing.

According to advantageous characteristics:

the frame comprises at least one meshed region directly over a recess for accommodating a loudspeaker;

the frame comprises at least one vertical wall capable of coming into contact with a vertical short wall of the front casing and the vertical wall carries at least one tab capable of coming into contact with the free end of the vertical short wall;

the tab extends over more than 30 mm;

the vertical wall arises from an edge which carries a rib capable of cooperating with a groove of the front casing;

the frame comprises at least one horizontal wall capable of coming into contact with a horizontal short wall of the front casing;

the frame and the front casing comprise relative positioning means.

The invention also proposes a frame for an image display device comprising a front casing, the frame comprising detachable fastening means on the front casing in which the frame comprises means capable of being handled manually in order to separate the frame from the front casing.

Advantageous possibilities are as follows:

the frame comprises at least one meshed region intended to be accommodated directly over a recess for accommodating a loudspeaker;

the frame comprises at least one vertical wall capable of coming into contact with a vertical short wall of the front casing, the vertical wall carrying at least one tab capable of coming into contact with the free end of the vertical short wall;

the tab extends over more than 30 mm;

the vertical wall arises from an edge which carries a rib capable of cooperating with a groove of the front casing;

the frame comprises at least one horizontal wall capable of coming into contact with a horizontal short wall of the front casing;

the frame comprises means of positioning relative to the front casing.

BRIEF DESCRIPTION OF THE DRAWINGS

Other characteristics of the invention will become apparent from the following description. The embodiment described is taken by way of nonlimiting example, with reference to the appended drawings, in which.

DETAILED DESCRIPTION

Figure 1:
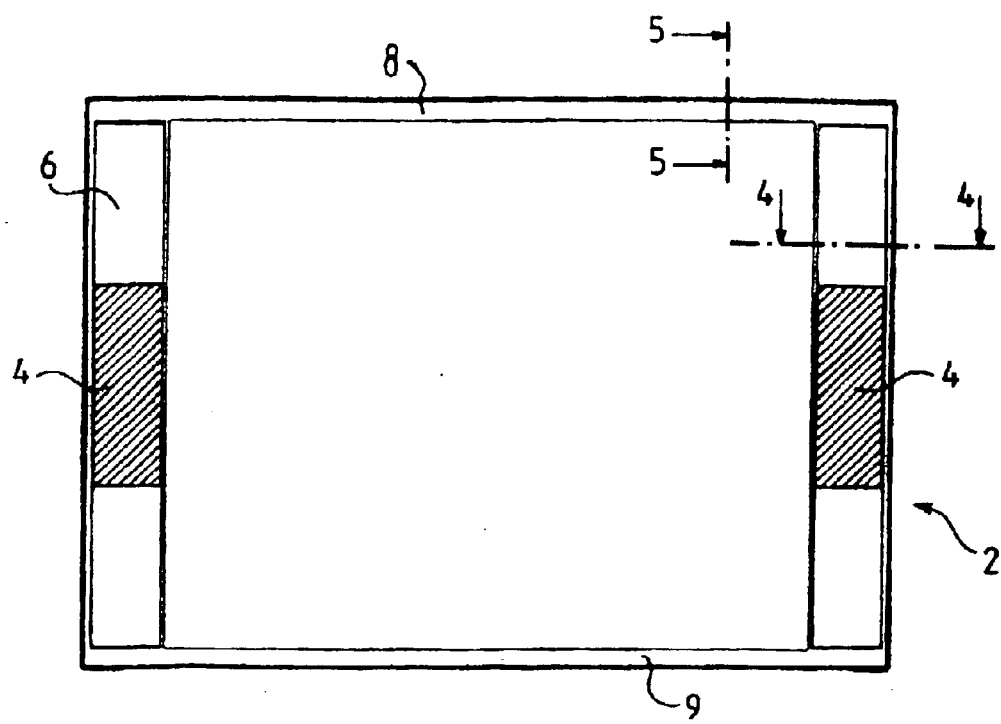
FIG. 1 shows a front view of a frame for a display device according to the invention.

A frame 2 according to the invention has a generally rectangular shape so as to surround the active part of a display device, for example the cathode-ray tube of a television set. In front view (FIG. 1), the frame 2 mainly comprises two parallel vertical edges 6 and two parallel horizontal arms, the upper arm 8 and the lower arm 9, respectively.

The edges 6 and the upper 8 and lower 9 arms lie in the same plane. The edges 6 each comprise a meshed region 4 intended to be placed directly over a loudspeaker, which the display device may possibly comprise.

The frame 2 comprises two mutually parallel vertical walls 10 which extend from the outer limit of the edges 6, perpendicularly to the edges 6. The frame 2 comprises an upper horizontal wall 12 which extends from the outer limit of the upper arm 8, perpendicular to the upper arm 8 and two lower horizontal walls 13 which extend from the outer limit of the lower arm 9, perpendicular to the lower arm 9.

The vertical walls 10 and the horizontal walls 12, 13 are secant in pairs at segments 14.

Figure 2:
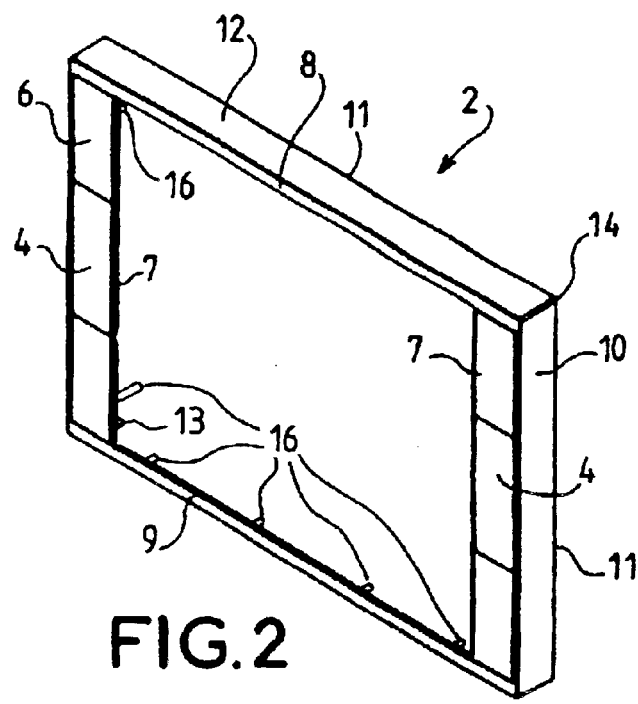
FIG. 2 shows the frame of FIG. 1 in perspective.
Figure 3:
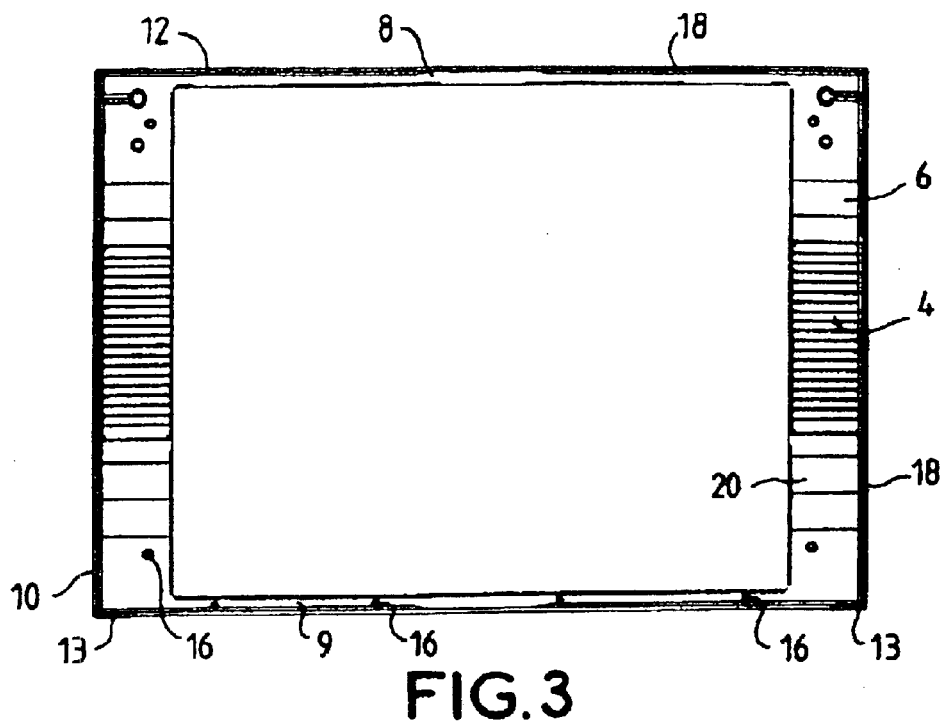
FIG. 3 shows the frame of FIG. 1 in rear view.

As is clearly visible in FIGS. 2 and 3, the frame 2 comprises pins 16 which allow it to be positioned with respect to the front casing of the display device.

Figure 4:
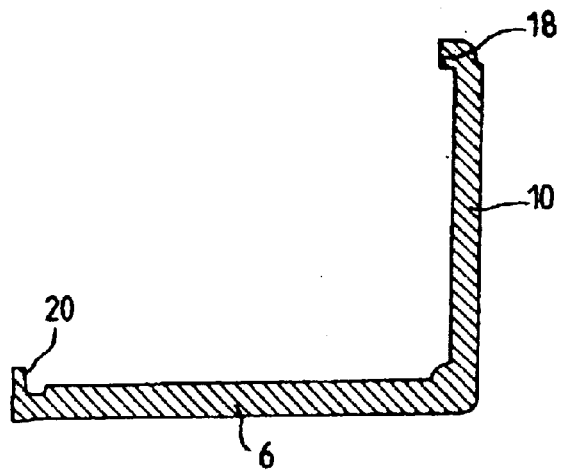
FIG. 4 is the view in section indicated by 4—4 in FIG. 1.
Figure 5:
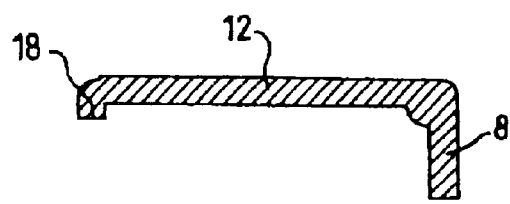
FIG. 5 is the view in section indicated by 5—5 in FIG. 1.

As can be seen in FIGS. 2, 3 and 4, the frame 2 comprises tabs 18 which extend from the free end 11 of the vertical walls 10 and from the upper horizontal wall 12, perpendicularly thereto and toward the inside of the frame 2. The tabs 18 are therefore located in a plane parallel to the plane of the edges 6 and of the arm 8.

The tabs 18 extend very little in the direction perpendicular to the wall 10, 12 from which they arise (for example the tabs 18 extend over 5 mm, thus exceeding by 2 mm a wall 10, 12 of 3 mm thickness). The largest dimension of the tabs 18 extends in a direction parallel to the free end 11 of the wall 10, 12 from which they arise. In a preferred manner, the tabs extend along their longest dimension over more than 30 mm so that they can be easily handled manually by a user as described below. For example, the tabs 18 arising from the vertical wall 10 lie vertically over 45 mm.

The edges 6 carry re-entrant ribs 20 (see FIG. 4) which extend from the inner end 7 of each edge, perpendicular to the edge 6 and rearward. The ribs 20 are therefore parallel to the side walls 10 which also extend rearward.

Figures 6, 7:
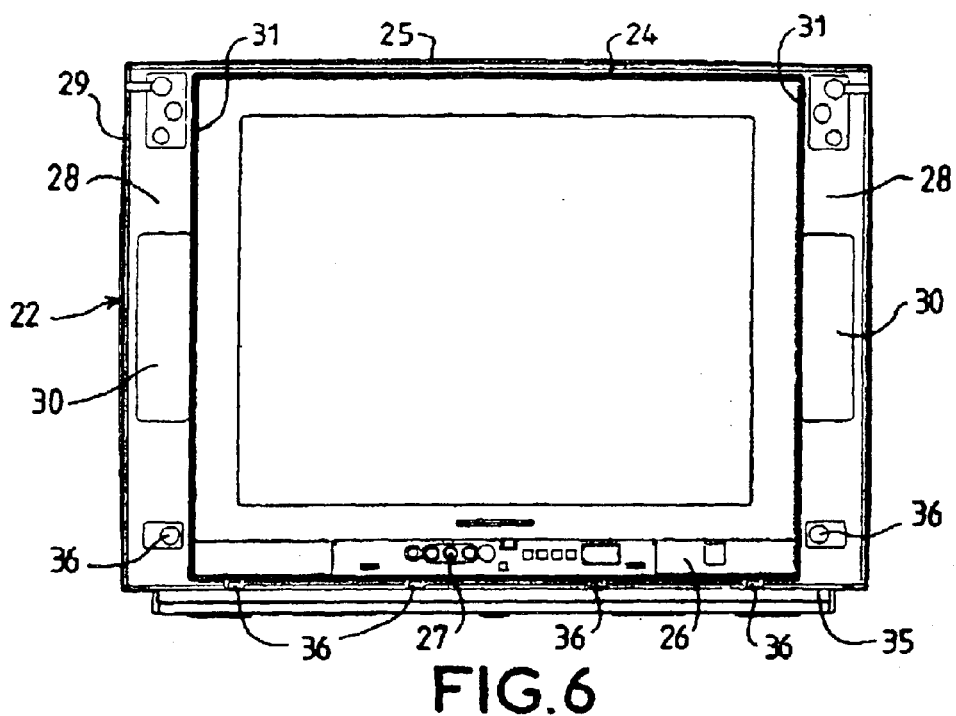
FIG. 6 shows a front casing according to the invention in front view.
FIG. 7 shows the front casing of FIG. 6 in side view.
Figure 8:
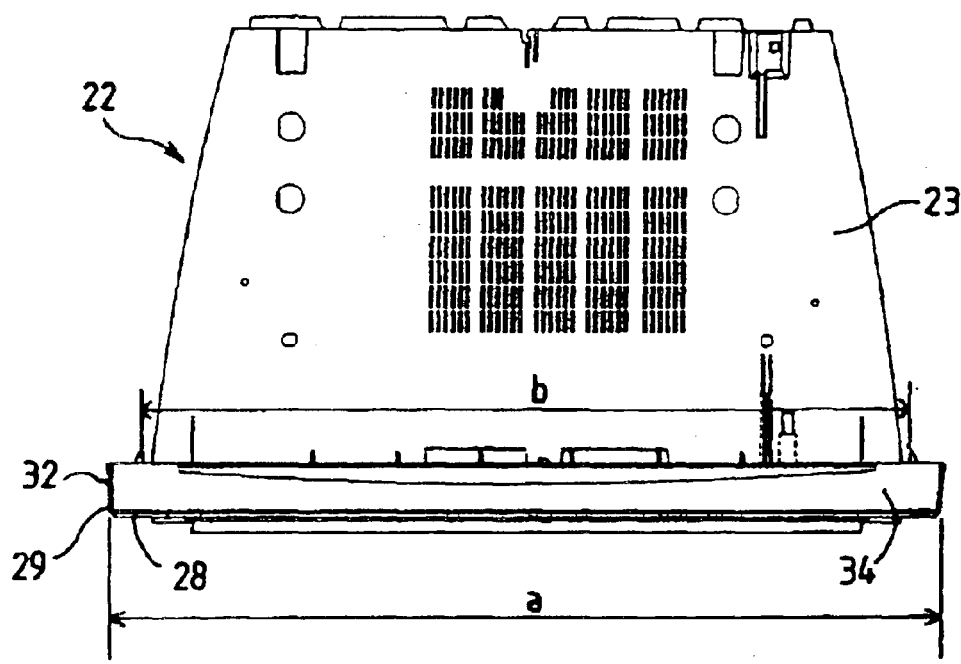
FIG. 8 shows the front casing of FIG. 6 in top view.

The display device comprises a front casing 22, shown in FIGS. 6, 7 and 8, on which are mounted a substantially flat and substantially vertically arranged screen (not shown) which forms the active part of the display device, a chassis (not shown) which carries electrical components in order to power the screen and to transmit electrical signals representing the image to the screen and a rear casing (not shown) which closes the front casing 22 from the back. The frame 2 is also mounted on the front casing 22 as described below.

The axis perpendicular to the screen passing through the center of the screen is defined as being the axis of the screen.

As is clearly visible in FIG. 6, the front casing comprises an upper strip 24, a lower strip 26 which carries recesses 27 for control members electrically connected to the chassis to pass through, and two side strips 28.

The front casing 22 is fitted with passages 36 intended to accommodate the pins 16 of the frame 2.

Each side strip 28 carries a recess 30 in order to accommodate a loudspeaker. Each side strip 28 also defines the groove 31 which extends vertically and is made so as to be able to accommodate the corresponding rib 20 of the frame 2, as described below.

Vertical short walls 32 extend rearward from each side strip 28, more specifically from the outer end 29 of each side strip 28. An upper horizontal short wall 34 extends rearward from the upper end 25 of the upper strip 24 and a lower horizontal short wall 35 extends rearward from the lower end of the lower strip 26. As is clearly visible in FIGS. 7 and 8, a horizontal plate 23 extends rearward from the lower strip 26. The plate 23 carries the frame.

The external dimensions (for example horizontal a) of the front casing 22 in the plane of the strips 24, 26, 28 (that is to say in a plane perpendicular to the axis of the screen) are in particular greater than those of the rear casing (for example horizontal b) so as to generate a space (horizontally a–b) for the means for fastening the frame 2 which are independent of the means for fastening the rear casing to the front casing 22.

The means for fastening the frame 2 to the front casing 22 therefore extend outward (that is to say, they are further away from the axis of the screen) compared with the means for fastening the rear casing to the front casing 22.

Thus the frame 2 can be mounted on the front casing 22 and the rear casing can be mounted on the front casing 22 completely independently, the first on the front, the second on the back.

Figure 9:
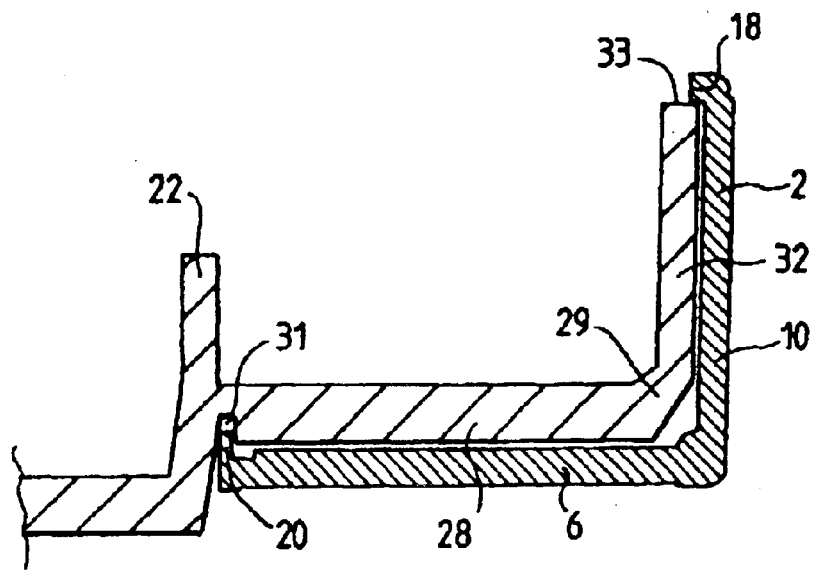
FIG. 9 shows, in section, the assembly of the frame of FIG. 1 and of the front casing of FIG. 6, on the sectional plane indicated by 4—4 in FIG. 1.

When the frame 2 is mounted on the front casing 22, the respective parts of these two pieces engage as shown in detail in FIG. 9. The horizontal walls 12, 13 extend parallel to and in contact with horizontal short walls 34, 35 respectively; the vertical walls 10 extend parallel to and in contact with each vertical short wall 32, respectively. Thus the frame 2 surrounds the screen of the display device.

Each tab 18 is in contact with the free end 33 of the short wall 32, 34 corresponding to the wall 10, 12 from which it arises. Thus, the tabs 18 ensure, in cooperation with the edges 6 or the upper arm 8, that the frame 2 is immobilized with respect to the front casing 22 in the forward-rearward direction (that is to say in the direction of the axis of the screen).

Moreover, each rib 20 cooperates with a groove 31, which makes it possible (added to the vertical short wall 32—vertical wall 10 contact) to immobilize the frame 2 with respect to the front casing 22 in the horizontal direction perpendicular to the axis of the screen.

Finally, the immobilization in the vertical direction of the frame 2 with respect to the front casing 22 is carried out by the upper 12 and lower 13 horizontal walls in contact with the upper 34 and lower 35 horizontal short walls.

The material from which the frame 2 is made and the dimensions of the frame 2 (especially its thickness) are such that the frame 2 may be easily deformed by a user who desires to take off the frame 2, for example in order to replace it with a frame of a different color.

This is because, in order to take off the frame 2 from the front casing 22, it is enough to release the tabs 18 one by one from the end 33 of the short wall 32, 34 with which they are in contact.

Thus, the frame 2 may be separated from the front casing 22 by a simple relative movement of the tabs 18 with respect to the front casing 22.

The preferred dimension of the tabs 18, mentioned above, makes it possible for this release to be carried out manually.

Moreover, the cooperation of the pins 16 and of the passages 36 makes it possible to ensure that the replacement frame will be assembled correctly by the user.

Furthermore, as has been seen, it is possible to mount and take off the frame 2 or the rear casing independently of each other. Thus the user who changes the frame does not have to take into account the rear casing and therefore does not risk touching the chassis (which could be dangerous because of the high voltages present on the circuits of the chassis); similarly, the professional operator who wishes to access the chassis does not have to take into account the frame 2 and therefore access to the chassis remains simple in spite of the presence of the frame 2.

What is claimed is:

1. A device for displaying an image comprising a front casing on which a screen and a rear casing are mounted, a frame surrounding the screen being detachably fastened to the front casing independently of the rear casing, the frame comprising means capable of being handled manually in order to separate the frame from the front casing wherein:
the frame comprises at least one vertical wall capable of coming into contact with a vertical short wall of the front casing parallel to the vertical wall, wherein the vertical wall carries at least one vertical tab perpendicular to the vertical wall and capable of coming into contact with the free end of the vertical short wall and wherein the vertical wall arises from an edge which carries a rib capable of cooperating with a groove on the front casing.

2. The device as claimed in claim 1, in which the at least one vertical tab extends over more than 30 mm.

3. The device as claimed in claim 1, in which the frame comprises at least one horizontal wall capable of coming into contact with a horizontal short wall of the front casing.

4. The device as claimed in claim 1, in which the frame and the front casing comprise relative positioning means.

5. A device for displaying an image comprising a front casing on which a screen and a rear casing are mounted, a frame surrounding the screen being detachably fastened to the front casing independently of the rear casing, the frame comprising means capable of being handled manually in order to separate the frame from the front casing wherein the frame comprises at least one meshed region directly over a recess of the front casing in order to accommodate a loudspeaker, wherein the frame comprises at least one vertical wall capable of coming into contact with a vertical short wall of the front casing parallel to the vertical wall and wherein the vertical wall arises from an edge which carries a rib capable of cooperating with a groove on the front casing.

6. A frame for an image display device comprising a front casing, the frame comprising means for detachable fastening thereof on the front casing and comprises means capable of being manually handled in order to separate the frame from the front casing wherein the frame comprises at least one vertical wall capable of coming in contact with a vertical short wall of the front casing parallel to the vertical wall, the vertical wall carrying at least one vertical tab perpendicular to the vertical wall and capable of coming into contact with the free end of the vertical short wall, and wherein the vertical wall arises from an edge which carries a rib capable of cooperating with a groove on the front casing.

7. The frame as claimed in claim 6, in which the at least one vertical tab extends over more than 30 mm.

8. The frame as claimed in claim 6, in which the frame comprises at least one horizontal wall capable of coming into contact with a horizontal short wall of the front casing.

9. The frame as claimed in claim 6, in which the frame comprises means of positioning relative to the front casing.

* * * * *